United States Patent
Xiao et al.

(10) Patent No.: US 11,755,931 B2
(45) Date of Patent: Sep. 12, 2023

(54) PERFORMING NATURAL LANGUAGE BASED REASONING AND AUTOMATION BY TRANSFORMING A CONFIGURATION MANAGEMENT DATABASE TO A KNOWLEDGE BASE

(71) Applicant: INTERNATIONAL BUSINESS MACHINES CORPORATION, Armonk, NY (US)

(72) Inventors: Jin Xiao, White Plains, NY (US); Anup Kalia, Elmsford, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 714 days.

(21) Appl. No.: 16/375,989

(22) Filed: Apr. 5, 2019

(65) Prior Publication Data
US 2020/0320407 A1    Oct. 8, 2020

(51) Int. Cl.
*G06N 5/04*    (2023.01)
*G06N 5/02*    (2023.01)
*G06F 16/21*    (2019.01)

(52) U.S. Cl.
CPC ............. *G06N 5/04* (2013.01); *G06F 16/214* (2019.01); *G06N 5/02* (2013.01)

(58) Field of Classification Search
CPC ........... G06F 16/214; G06N 5/04; G06N 5/02
See application file for complete search history.

(56) References Cited

U.S. PATENT DOCUMENTS

| | | | |
|---|---|---|---|
| 6,457,002 B1 | 9/2002 | Beattie et al. | |
| 7,926,031 B2 | 4/2011 | Faihe et al. | |
| 7,975,031 B2* | 7/2011 | Bhattacharya | G06F 9/5072 |
| | | | 717/121 |
| 8,219,649 B2* | 7/2012 | Ball | G06F 9/453 |
| | | | 709/227 |
| 8,380,645 B2 | 2/2013 | Kowalski | |
| 8,612,574 B2* | 12/2013 | Akiyama | G06F 9/44505 |
| | | | 709/224 |

(Continued)

OTHER PUBLICATIONS

Gupta et al., "Automating ITSM incident management process." Autonomic Computing, 2008. ICAC'08. International Conference on. IEEE, 2008. (Related), pp. 141-150.

*Primary Examiner* — Mark D Featherstone
*Assistant Examiner* — Kweku William Halm
(74) *Attorney, Agent, or Firm* — CANTOR COLBURN LLP; Joseph Curcuru

(57) ABSTRACT

A technique relates to natural language automation to implement service requests. An intent of a service request is determined by accessing a knowledge base, the knowledge base being configured for dynamic discovery of dependencies related to configuration items, the configuration item being among the configuration items, the configuration items being associated with concepts. An intent application programming interface (API) database comprising a specification is accessed, the specification describing parameters of APIs and associations that the APIs have with the concepts of the knowledge base. Associated parameters of an API associated with the intent of the service request are determined based on the intent API database. The API is caused to be executed to accomplish the service request.

17 Claims, 12 Drawing Sheets

(56) References Cited

U.S. PATENT DOCUMENTS

| | | | |
|---|---|---|---|
| 8,843,503 B2* | 9/2014 | Ayachitula | G06F 8/71 |
| | | | 707/755 |
| 8,984,483 B2* | 3/2015 | Qian | H04L 41/0843 |
| | | | 717/121 |
| 9,573,807 B1* | 2/2017 | Kaufman | G11B 5/3929 |
| 9,823,950 B1* | 11/2017 | Carrier | G06F 9/543 |
| 9,870,422 B2 | 1/2018 | Simeonov et al. | |
| 9,934,327 B2 | 4/2018 | Anchuri et al. | |
| 10,726,140 B2* | 7/2020 | Puvvada | G06F 21/604 |
| 2003/0154118 A1* | 8/2003 | Druyan | G06Q 10/06315 |
| | | | 705/7.13 |
| 2004/0139193 A1* | 7/2004 | Refai | H04L 41/0803 |
| | | | 709/224 |
| 2005/0114479 A1* | 5/2005 | Watson-Luke | G06F 8/71 |
| | | | 715/735 |
| 2008/0183690 A1* | 7/2008 | Ramachandran | G06F 8/71 |
| | | | 707/999.005 |
| 2008/0263084 A1* | 10/2008 | Faihe | G06Q 10/06 |
| 2009/0094462 A1* | 4/2009 | Madduri | G06F 21/572 |
| | | | 713/182 |
| 2009/0313219 A1* | 12/2009 | Gupta | G06Q 10/10 |
| 2010/0082701 A1* | 4/2010 | Maheshwari | G06F 16/252 |
| | | | 707/803 |
| 2011/0029767 A1* | 2/2011 | Ayachitula | H04L 67/1095 |
| | | | 713/100 |
| 2011/0295788 A1* | 12/2011 | Kowalski | G06F 16/90332 |
| | | | 706/50 |
| 2012/0166485 A1* | 6/2012 | Tashiro | G06F 16/24573 |
| | | | 707/783 |
| 2012/0179642 A1 | 7/2012 | Sweeney et al. | |
| 2014/0317128 A1* | 10/2014 | Simeonov | G06F 7/24 |
| | | | 707/754 |
| 2017/0091629 A1* | 3/2017 | Li | G06N 20/00 |
| 2020/0192727 A1* | 6/2020 | Savenkov | G06F 9/547 |
| 2020/0233862 A1* | 7/2020 | Shaked | G06F 16/2423 |
| 2020/0311208 A1* | 10/2020 | Koohmarey | G06N 3/004 |

* cited by examiner

FIG. 6

INTENT IDENTIFICATION:(A) FOR EACH INTENT EXTEND THE FEATURE MATRIX

{
"start_db2_database":{"start":2, "db2":2, "database":2, "instance":1, "server":1},
"restart_db2_database":{"restart":2, "db2":2, "database":2, "instance":1, "server":1}, "start_db2_database_instance":{"start":2, "db2":2, "database":1, "instance":2, "server":1},
"restart_db2_database_instance":{"restart":2, "db2":2, "database":1, "instance":2, "server":1}, "start_linux_server":{"start":2, "linux":2, "server":2},
"restart_linux_server": {"restart":2, "linux":2, "server":2}, "start_sshd_service":{"start":2, "sshd":2, "service":2, "server":1},
"restart_sshd_service": {"restart":2, "sshd":2, "service":2, "server":1}
}

FIG. 9 — PARAMETER RECOMMENDATION (A) CREATE A SET OF INITIAL PAYLOAD BASED ON THE SERVICE REQUEST

Service Request: please restart database HUTCH in server sla-dev-icd-rhel-sjx64117

Apply Filters: please restart database HUTCH in server sla-dev-icd-rhel-sjx64117

Inputs:
- HUTCH, sla-dev-icd-rhel-sjx64117
- 2 parameters
- restart_db2_database
- 3 API attributes

Apply Padding: 1. HUTCH, 2. sla-dev-icd-rhel-sjx64117, 3. None

Generate Permutations:
- A. 1. HUTCH, 2. sla-dev-icd-rhel-sjx64117, 3. None
- B. 1. HUTCH, 2. None, 3. sla-dev-icd-rhel-sjx64117

PERFORMING NATURAL LANGUAGE BASED REASONING AND AUTOMATION BY TRANSFORMING A CONFIGURATION MANAGEMENT DATABASE TO A KNOWLEDGE BASE

BACKGROUND

The present invention generally relates to computing systems, and more specifically, to computer systems, computer-implemented methods, and computer program products for performing natural language based reasoning and automation by transforming a configuration management database to a knowledge base.

A configuration management database is a database or repository used by an organization to store information about hardware and software assets (commonly referred to as configuration items. Sometimes, the configuration management database can be a legacy system. A legacy system refers to outdated computer systems, programming languages, and/or application software that are used instead of available upgraded versions.

SUMMARY

Embodiments of the invention are directed to a computer-implemented method for natural language automation to implement service requests. A non-limiting example of the method includes receiving, by a computer system, at least one service request related to at least one configuration item and determining, by the computer system, an intent of the at least one service request by accessing a knowledge base, the knowledge base being configured for dynamic discovery of dependencies related to configuration items, the at least one configuration item being among the configuration items, the configuration items being associated with concepts. The method includes accessing, by the computer system, an intent application programming interface (API) database comprising a specification, the specification describing parameters of APIs and associations that the APIs have with the concepts of the knowledge base. Also, the method includes determining, by the computer system, associated parameters of at least one API associated with the intent of the at least one service request based on the intent API database, and causing, by the computer system, the at least one API to be executed to accomplish the at least one service request.

Embodiments of the invention are directed to a system for natural language automation to implement service requests. A non-limiting example of the system includes a processor, and memory coupled to the processor and comprising computer-executable instructions that, when executed by the processor, cause the processor to perform a method. A non-limiting example of the method includes receiving, by the processor, at least one service request related to at least one configuration item, and determining, by the processor, an intent of the at least one service request by accessing a knowledge base, the knowledge base being configured for dynamic discovery of dependencies related to configuration items, the at least one configuration item being among the configuration items, the configuration items being associated with concepts. The method includes accessing, by the processor, an intent application programming interface (API) database comprising a specification, the specification describing parameters of APIs and associations that the APIs have with the concepts of the knowledge base. Also, the method includes determining, by the processor, associated parameters of at least one API associated with the intent of the at least one service request based on the intent API database, and causing, by the processor, the at least one API to be executed to accomplish the at least one service request.

Embodiments of the invention are directed to a computer program product for natural language automation to implement service requests, the computer program product comprising a computer readable storage medium having program instructions embodied therewith, wherein the computer readable storage medium is not a transitory signal per se, the program instructions executable by a computer to cause the computer to perform a method. A non-limiting example of the method includes receiving, by the computer system, at least one service request related to at least one configuration item, and determining, by the computer system, an intent of the at least one service request by accessing a knowledge base, the knowledge base being configured for dynamic discovery of dependencies related to configuration items, the at least one configuration item being among the configuration items, the configuration items being associated with concepts. The method includes accessing, by the computer system, an intent application programming interface (API) database comprising a specification, the specification describing parameters of APIs and associations that the APIs have with the concepts of the knowledge base. Also, the method includes determining, by the computer system, associated parameters of at least one API associated with the intent of the at least one service request based on the intent API database, and causing, by the computer system, the at least one API to be executed to accomplish the at least one service request.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 depicts examples of feature matrixes according to embodiments of the invention;

FIG. 9 depicts an example of how the knowledge base is used to evaluate the validity of different parameter value permutations and auto-fill missing parameters according to embodiments of the invention;

Figure 1:
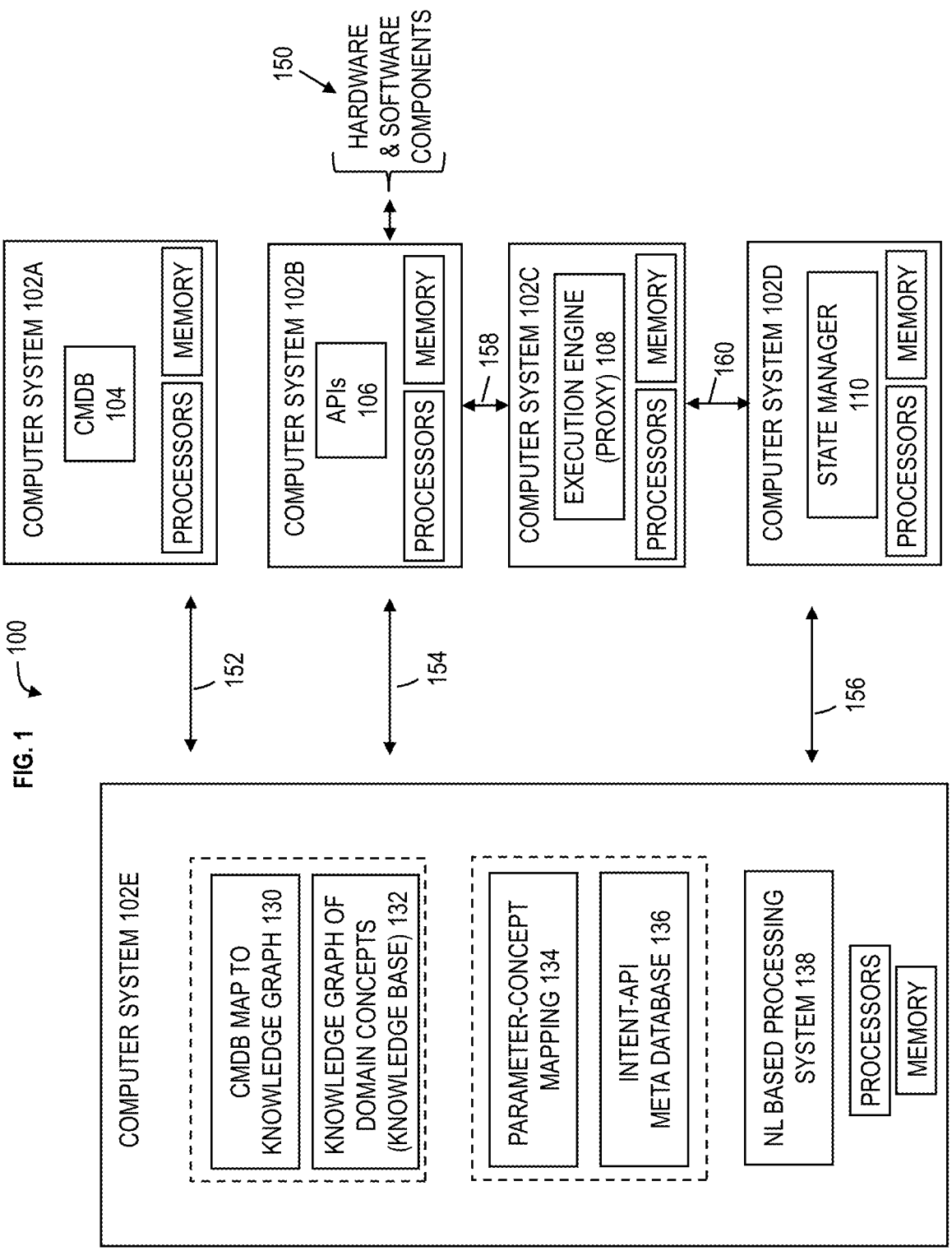
FIG. 1 depicts a communication system/network according to embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the embodiments of the invention, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

Turning now to an overview of technologies that are more specifically relevant to aspects of the invention, an organization can have a configuration management database (CMDB) that is a legacy CMDB. The relationships and information in the legacy CMDB might not be apparent to newer systems, and therefore do not lend themselves to automation. The legacy system can be problematic, due to compatibility issues and/or inoperability with newer systems. More specifically, legacy systems can be associated with terminology or processes that are no longer applicable to current contexts or content, thus creating confusion.

Turning now to an overview of the aspects of the invention, one or more embodiments of the invention provide a computer system configured and arranged to create a natural language (NL) based reasoning and automation process based on a CMDB-transformed knowledge base (KB) that can dynamically discover dependencies (both concept relations and context relations) and build context and relations among NL-based utterances. The computer system in accordance with aspects of the invention ingests the configuration items (CIs) and their relations in a configuration management database (CMDB) and produces a domain-specific knowledge base (KB). The computer system is configured to provide a generalized CMDB to KB transformation process taking into account domain-specific typology, relations, and value semantics. The computer system utilizes a domain-specific KB and reasoning process to transform NL-based commands (e.g., from a human user) into valid application programming interfaces (APIs) and parameters. The computer system is configured to transform the domain-specific knowledge base (KB) to user-specific KB based on the user's usage history and context. The computer system processes NL-based commands in bulk to provide recommendations and context in scale and support direct interfacing to automation service providers via API innovation with auto-generated system-specific payloads. Therefore, the methods and systems in accordance with embodiments of the invention can provide automation with legacy CMDB systems as well as provide compatibility and operability between legacy CMDB systems and newer systems without the confusion associated with known approaches to interfacing with legacy systems.

Turning now to a more detailed description of aspects of the present invention, FIG. 1 depicts a system 100 according to embodiments of the invention. The system 100 includes various computer systems 102A, 102B, 102C, 102D, and 102E. Although computer systems 102A through 102E can be separate, functions of two or more of the computer systems 102A through 102E can be performed on the same computer system. Also, any of the computer systems 102A through 102E can have distributed architectures. The computer systems 102A through 102E can each include processors (processor circuitry) and memory having computer executable instructions that execute on the processors in accordance with embodiments of the invention.

One or more computer systems 102A can include a configuration management database (CMDB) 104. The CMDB 104 is a database or repository used by an organization to store information about hardware and software assets which are commonly referred to as configuration items (CI). This database acts as a data warehouse for the organization and also stores information regarding the relationship between its assets. The CMDB provides a means of understanding the organization's assets and their relationships, such as information systems, upstream sources or dependencies of assets, and the downstream targets of assets. Although repositories similar to CMDBs have been used by information technology (IT) departments for many years, the term CMDB has more recently been formalized with the Infrastructure Technology Infrastructure Library (ITIL). ITIL is a set of concepts and practices for managing IT services, development, and operations. A configuration item type (or CI type) is the data type of the element or configuration item an enterprise wishes to store within the CMDB. Software, hardware, network, and storage CI types are stored and tracked in a CMDB. The CMDB records configuration items (CI) and details about the important attributes and relationships between CIs.

One or more computer systems 102B can include various types of application programming interfaces (APIs) 106. An API is a set of subroutine definitions, communication protocols, and tools for software, which allow two software programs (or two machines) to communicate with each other. The APIs 106 can communicate with various hardware and software components 150, for example, in a datacenter.

One or more computer systems 102C can include an execution engine 108. For example, the execution engine can be a proxy server. The execution engine 108 executes the requested API 106 to automatically perform changes to the software and hardware configurations in the hardware and software components 150. One or more computer systems 102D can include a state manager 110. The state manager 110 is configured to process each request as specific hardware and software executions. The APIs 106, execution engine 108, and state manager 110 can be implemented as modules.

One or more computer systems 102E can include a CMDB map to knowledge graph 130, knowledge graph of domain concepts 132 (also referred to as a domain-specific knowledge base (KB)), parameter concept mapping 134, intent API meta database 136, and natural language (NL) based processing system 138. The CMDB map to knowledge graph 130, knowledge graph of domain concepts 132, parameter concept mapping 134, intent API meta database 136, and NL based processing system 138 can be implemented as modules.

The computer systems 102A through 102E can be coupled and/or communicate over networks 152, 154, 156, 158, and 160. The networks 152, 154, 156, 158, and 160 can be wired, wireless, and/or a combination of wired and wireless networks. The various components, modules, engines, etc., described regarding FIG. 1 (and FIG. 2) can be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein can be a combination of hardware and programming. The programming can be processor executable instructions stored on a tangible memory, and the hardware can include processing circuitry for executing those instructions. Thus, a system memory can store program instructions that when executed by processing circuitry implement the engines described herein. Other engines can also be utilized to include other features and functionality described in other examples herein. Alternatively or additionally, the processors and/or modules can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Figure 2:
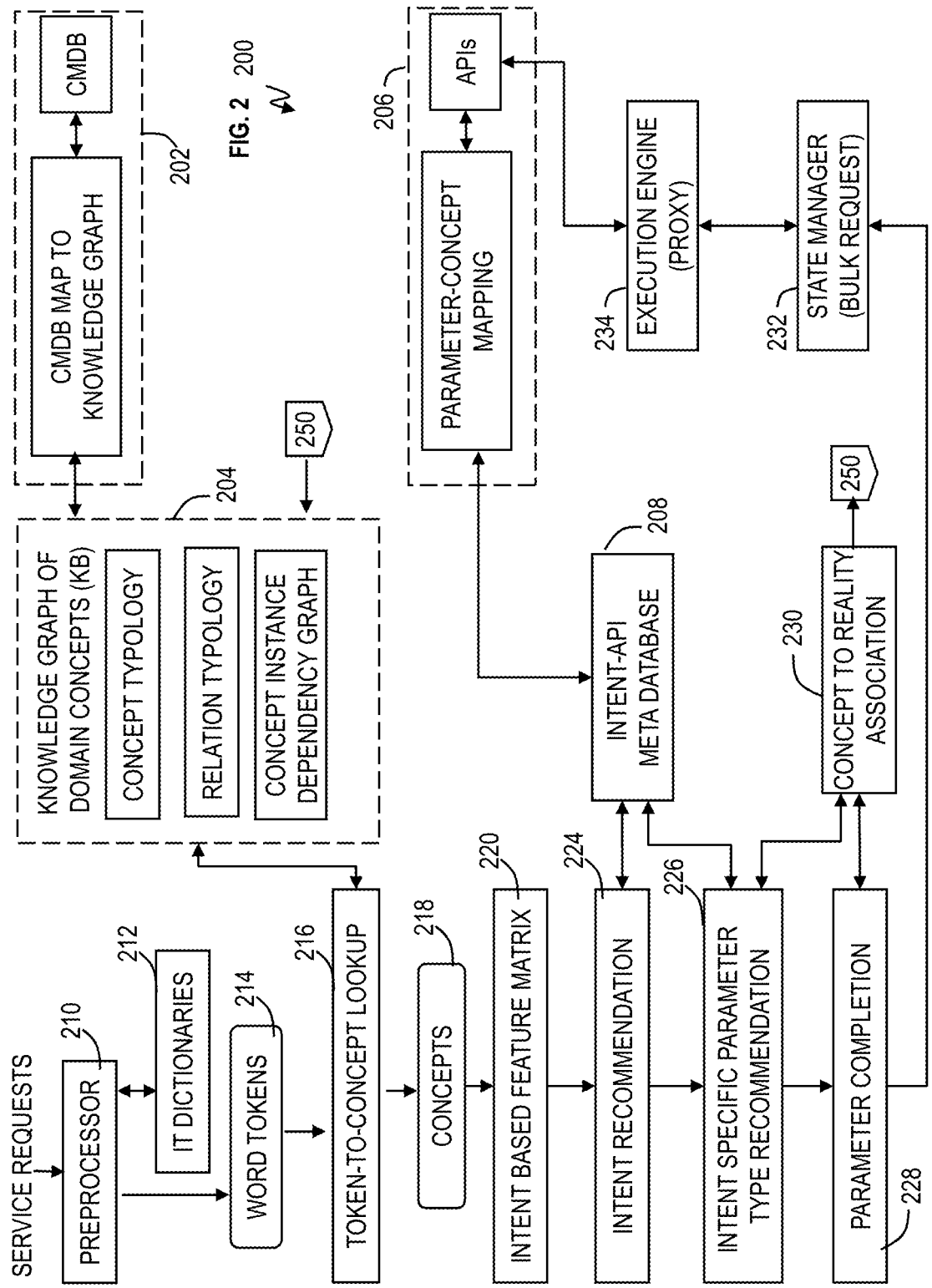
FIG. 2 depicts a system flow according to embodiments of the invention.
Figure 3:
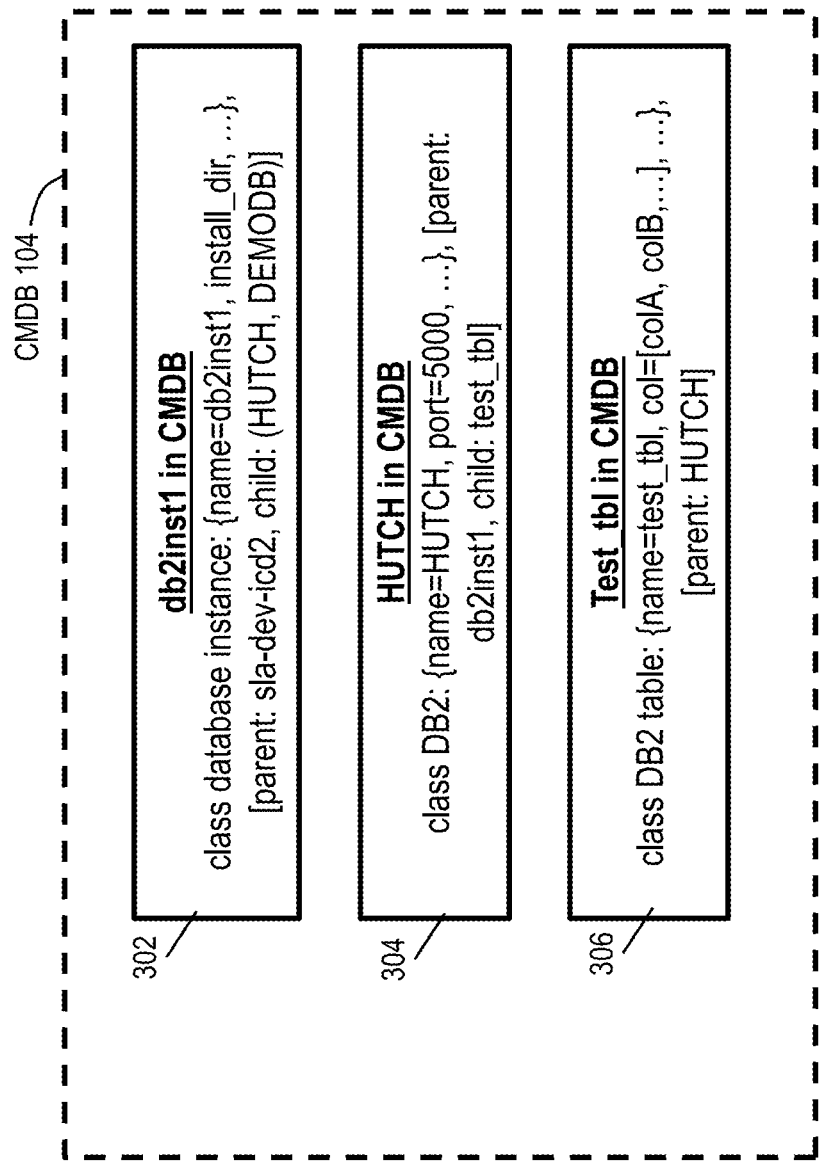
FIG. 3 depicts an example portion of a configuration management database according to embodiments of invention.
Figure 4:
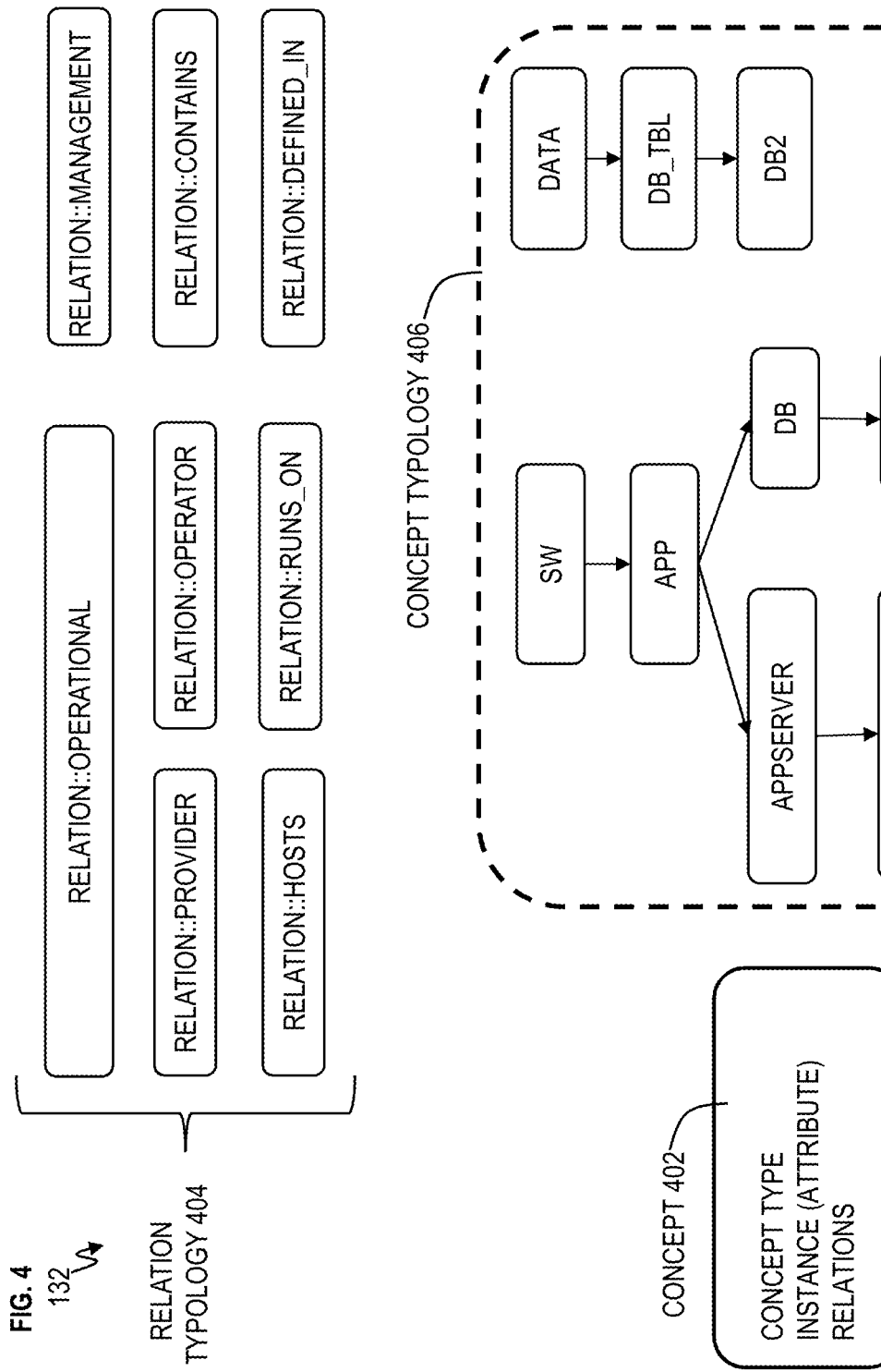
FIG. 4 depicts an example portion of a knowledge graph of domain concepts according to embodiments of the invention.
Figure 5:
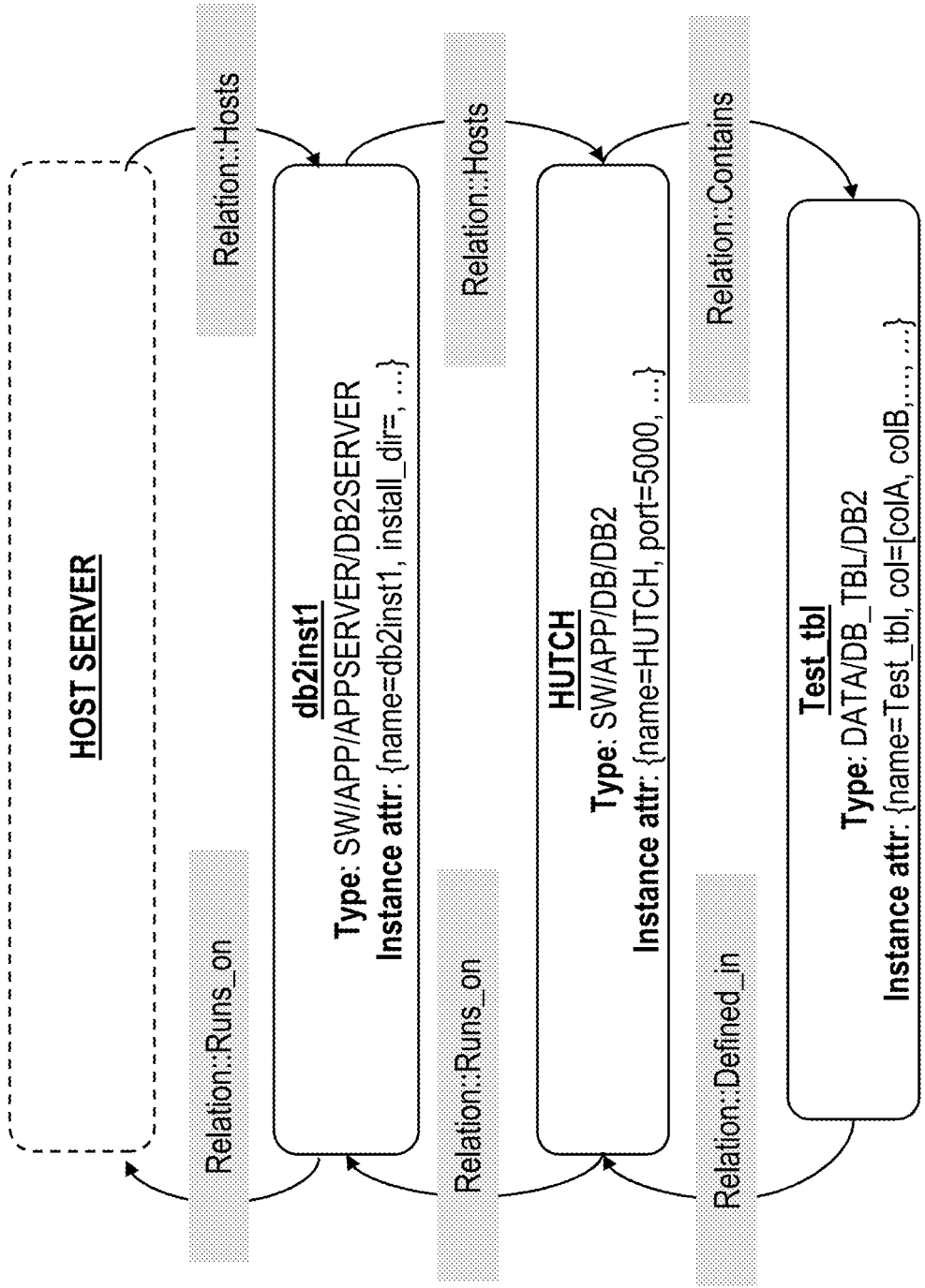
FIG. 5 depicts an example portion of a concept instance dependency graph according to embodiments of the invention.

FIG. 2 is a system flow diagram illustrating a computer-implemented method 200 according to embodiments of the invention. FIG. 3 depicts an example portion of the CMDB 104 according to embodiments of invention. FIG. 4 depicts an example portion of the knowledge graph of domain concepts 132 according to embodiments of the invention. FIG. 5 depicts an example portion of a concept instance dependency graph 502. The description below of the computer-implemented method 200 shown in FIG. 2 is provided with primary reference to the method 200 shown in FIG. 2 and with references, where appropriate, to the systems and other related features shown in FIGS. 1, 3, 4, and 5.

The method 200 begins at block 202 where the CMDB map to knowledge graph module 130 is configured to ingest (receive) data from the CMDB 104 and translate the existing CMDB (such as a legacy CMDB) to the knowledge base such as knowledge graph of domain concepts 132. The CMDB map to knowledge graph module 130 adds additional concepts to create the knowledge base 132. More specifically, CMDB map to knowledge graph module 130 is configured to map CIs from the CMDB 104 to a known knowledge base concept under the KB's concept typology (e.g., knowledge base concept topology 406 in FIG. 4), and/or expand the concept typology (e.g., knowledge base concept topology 406 in FIG. 4) if no direct correspondent exists. Similarly, CMDB map to knowledge graph module 130 is configured to map attributes under a CI to the knowledge base 132. Further, CMDB map to knowledge graph module 130 is configured to map relations between CIs to a known KB relation typology (e.g., knowledge base relation typology 404 in FIG. 4), and/or expand the relation typology (e.g., knowledge base relation typology 404 in FIG. 4) if no direct correspondent exists. The CIs are then reconstituted as an instance KB representing the particular CMDB within the new knowledge base 132. The knowledge graph of domain concepts 132 (domain-specific knowledge base) contains numerous instance KB which can be referred to as CIs for ease of understanding.

A portion of the CMDB 104 as represented as an instance KB can have the example hierarchical relationship depicted in FIG. 3. This legacy CMDB 104 could have relationships that are not known and/or not recognizable by new equipment and therefore not be able to allow for NL based reasoning and automation in the current state. Referring to FIG. 3, in this example, the object name db2inst1 is a class in the CMDB, and the db2inst is a class database instance which is an installed application of the database as seen in hierarchical view 302. View 302 also shows that db2instl has a parent relationship, e.g., parent: sla-dev-icd2 and a child relationship, e.g., child: (HUTCH, DEMODB). In hierarchical view 304, Hutch is a class DB2 with the object name HUTCH. View 304 also shows that Hutch has a parent relationship, e.g., parent: db2inst1 and a child relationship, e.g., child: test_tbl. In hierarchical view 306, the class DB2 table is a table with the object name test_tbl. The table (test_tbl) includes columns. View 306 also shows that test tbl has a parent relationship, e.g., parent: HUTCH.

Referring to FIG. 2, the knowledge graph of domain concepts 132 includes and/or is coupled to the knowledge base having been translated by the CMDB map to knowledge graph module 130, at block 204. The knowledge graph of domain concepts 132 (which can interchangeably be referred to as the knowledge base (KB)) includes the concept typology 406, relation typology 404, and the concept instance dependency graph 502 which are depicted as examples in FIGS. 4 and 5. A concept (e.g., concept 402) is defined as a KB instance of a CI with corresponding concept type, instance attributes, and instance relations, which in turn have relation types. The concept topology 406 depicted in FIG. 4 is the semantic definition of a concept 402 (e.g., DB2 database), under which a concept instance (previously as a CI in CMDB) and their attributes (previously as CI attributes in CMDB) are associated with. Concept topology defines the hierarchical associations of various concept types, together composing the IT world view. The relation typology 404 is the semantic definition of a relationship (e.g., HUTCH is hosted on db2inst1 as depicted in FIG. 5). In FIG. 4, an example concept 402 includes the concept type, instance (attribute), and relations. Similarly, relation typology 404 defines the relation types associating instance concepts. For example, the relation type RELATION::PROVIDER, when associated from entity A to entity B, denotes that A is a provider of B. An example relation typology 404 can include that the relation between objects, and example relations can include operational, provider, hosts, operator, runs on, management, contains, defined_in, etc. Also, FIG. 4 depicts an example concept typology 406. The example concept typology 406 can show software (SW) including an application (APP), and the application includes an application server (APPSERVER) and database (DB). The application sever has a software component (DB2SERVER) and the database (DB) include a database (DB2). The example concept typology 406 also illustrates that data is in a table having the name DB-TBL, and the table (DB-TBL) is in the database (DB2). The concept instance dependency graph 502 defines an instance level database that stores the managed entities/CIs (e.g., HUTCH, db2inst1, etc.), what the attributes are for the entities, what concept the entities belong to, and what relations the entities have among each other as depicted in FIG. 5. For completeness, FIG. 5 illustrates that the db2inst1 runs on some HOST SERVER.

p Referring to FIG. 2, the parameter-concept mapping module 134 is configured to identify the parameters of the APIs 106 and transform (pass) these parameters to be stored in the intent-API meta database 136, at block 206. The parameter-concept mapping module 134 generates a specification that describes the parameter of APIs 106 and what concepts the APIs have in the KB of the knowledge graph of domain concepts module 132, which can be used later to automatically match the desired intent in service request from a user. The parameter-concept mapping module 134 generates the parameters placed in the intent-API meta database 136 based on the original APIs 106. At block 208, the intent-API meta database (module) 136 stores the specification describing the parameters and concepts of APIs 106 for later use. The intent-API meta database module 136 does not store the APIs 106 themselves, but rather stores metadata regarding the APIs 106 for use in the automation process of service requests from a user.

At block 210, the preprocessor receives and processes service requests. The preprocessor is part of the NL based processing system (module) 138. With natural language understanding, NL based processing system (module) 138 is configured to analyze semantic features of input text and extract metadata from content, such as categories, concepts, entities, keywords, metadata, relations, semantic roles, etc. As one example, the NL based processing system (module) 138 can parse the service request to find and select predefined words, phases, etc. Further, the NL based processing system (module) 138 is configured to use custom annotation models (including information technology (IT) dictionaries, etc.) to identify domain-specific entities and relations associated with the service request at block 212. The service request can be a service ticket from a human user such as a user of the IT network described in the CMDB 104. The service request can be a request (text) to restart a particular database. The preprocessor of NL based processing system (module) 138 is configured to determine the intent of the service request. Although an example discusses a given service request to restart a database for explanation purposes, the NL based processing system (module) 138 is configured to process (simultaneously) hundreds of service requests.

The preprocessor is a NL-based text processor that generates word tokens. Together with IT dictionaries and/or other resources of the NL based processing system (module) 138 (from block 212), the processor generates word tokens (i.e., utterances that have IT semantic meaning) at block 214. An utterance is anything the user says and/or types as the service request. IT dictionaries include a dictionary of IT terminologies and utterances. The word tokens can be text phrases that have meanings for defining the service request. The preprocessor of NL based processing system (module) 138 can parse the IT dictionaries to access meanings of text in the service request to appropriately determine the meanings of service request (text), and therefore generate word tokens from the service request. As part of the token-to-concept lookup at block 216, the word tokens are then searched in the KB of knowledge graph of domain concepts module 132 to identify existing entities (KB instances/CIs) and their concepts, as well as how the entities (KB instances/CIs) might relate to each other. Particularly, NL based processing system (module) 138 is configured to perform a token-to-concept lookup in which a search is performed in the knowledge graph of domain concepts module 132 to match the word tokens to KB instances/CIs, and therefore output concepts at block 218. The output concept (such as example concept 402) associated with the service request can include the corresponding concept type, instance attributes, and instance relations as defined as a KB instance (formerly CI) of the knowledge graph of domain concepts module 132.

Figure 7:
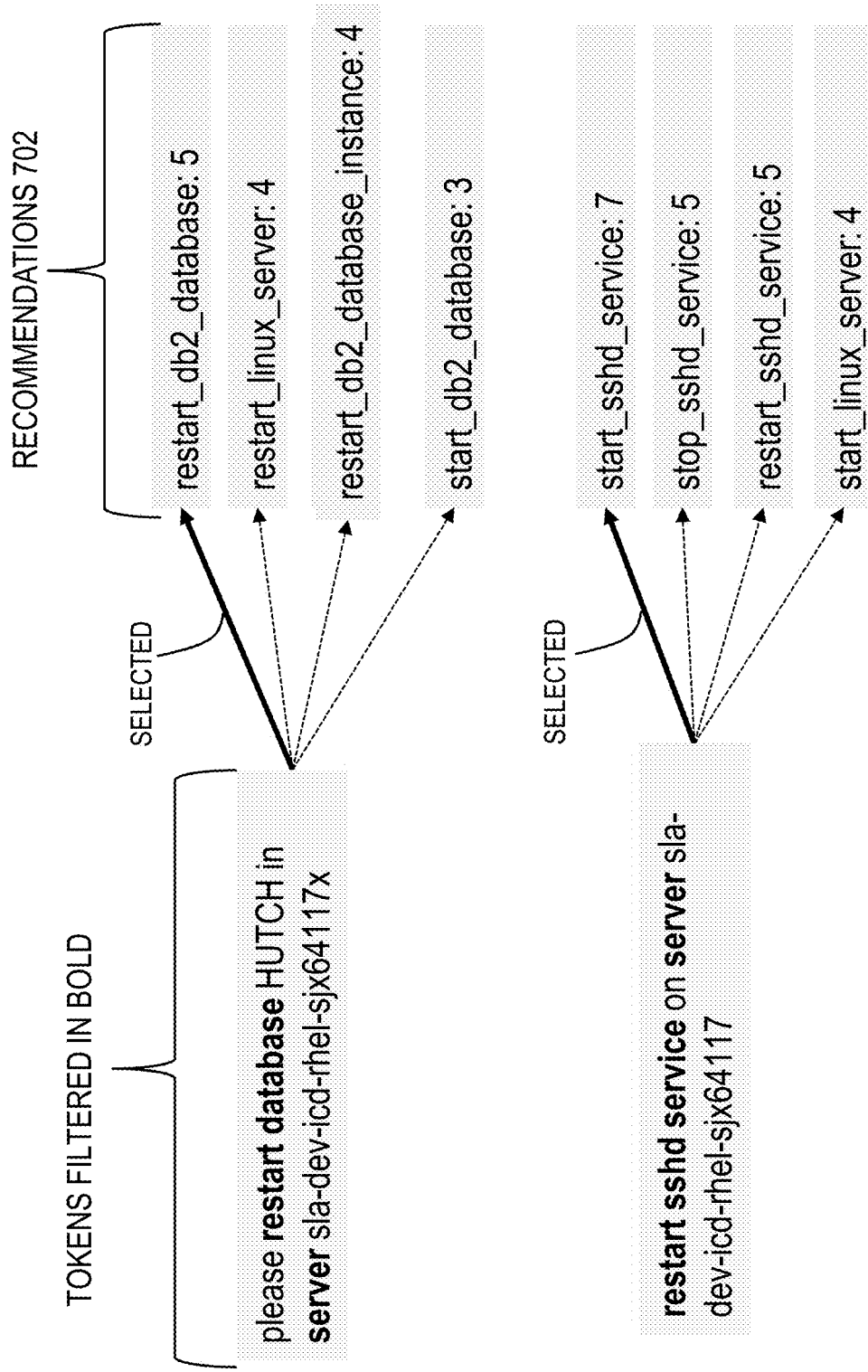
FIG. 7 depicts an example intent identification with computations according to embodiments of the invention.

Referring to FIG. 2, the intent of the user who made the service request has to be ascertained. At block 220, the preprocessor of NL based processing system (module) 138 is configured to execute an intent-based feature matrix. The intent-based feature matrix highlights and applies relative weights of the expected concepts, which can be used to support intent recommendation. As part of processing the intent of the NL-based service request, the intent-based feature matrix is a reference used to compute the likelihood of an API match (from the APIs 106 having associated parameters in the intent-API meta database 136) to the NL-based service request text. As an example illustration, FIG. 6 depicts examples of feature matrixes. Continuing the scenario noted above, the example service request is to perform a restart action or start action as determined by NL based processing system (module) 138. How the related recommendations are weighed is based on the feature matrix. The appearances of "restart" or "start" related action verbs yield high (greater) weights for the APIs listed in this example. The APIs are identified in bold in FIG. 6 and are candidates to perform the intent start and/or restart. The existence of "instance" and "database" noun phrases would further uplift (increase) the weight assignment of start_db2_database_instance above start_db2_database, which is in turn weighed higher than start_linux_server. Numeral weights such as 1 and 2 are shown in the feature matrix in FIG. 6 for example purposes, and these weights can be added (or accounted for) to find the intent with the greatest weight. To meet the intent, there are 8 example (candidate) APIs illustrated with their respective weights as depicted in FIG. 6 but there could be fewer or more. The intents can be for one service request or more than one service request Referring to FIG. 2, at block 224, the NL based processing system (module) 138 is configured to perform intent recommendation, which parses the intent-API meta database 136 for corresponding APIs 106. The intent recommendation is to compute the likelihood of API matches based on the intent-based feature matrix (e.g., depicted in FIG. 6) against the intent-API meta database 136 to recommend the most likely APIs 106. For example, candidate intents are matched to descriptions (including parameters) for the APIs described in the intent-API meta database 136 in order to pass/recommend matches. Further, a concept has previously been determined for the intent, and the concept can be utilized to parse the intent-API meta database 136 to find the corresponding APIs 106. The APIs 106 are associated with concepts. FIG. 7 depicts an example intent identification with computations. For the given service request(s), the intent identification (performed by the NL based processing system (module) 138) computes the weights for all intents. The recommendations 702 are example APIs, and the intent recommendation selects the API having the greatest weight for each word token (i.e., service request or intent). The weight computation is based on matching verb and noun phrasing to API's feature matrix. It follows the example described in FIG. 6. From the word tokens and feature matrix in FIG. 6, the NL based processing system (module) 138 determines that that are two requests/intents, where one request is (1) restart database HUTCH in server sla-dev-icd-rhel-sjx64117x and the second request is (2) restart sshd service on server sla-dev-icd-rhel-sjx64117. From adding or computing the associated weights applied in FIG. 6, the NL based processing system (module) 138 determines that the intent recommendation with the greatest weight (i.e., 5) for one intent (restart database HUTCH in server sla-dev-icd-rhel-sjx64117x) is restart_db2_database: 5, while the intent recommendation with the greatest weight (i.e., 7) for the second intent (restart sshd service on server sla-dev-icd-rhel-sjx64117) is start_sshd_service: 7.

Figure 8:
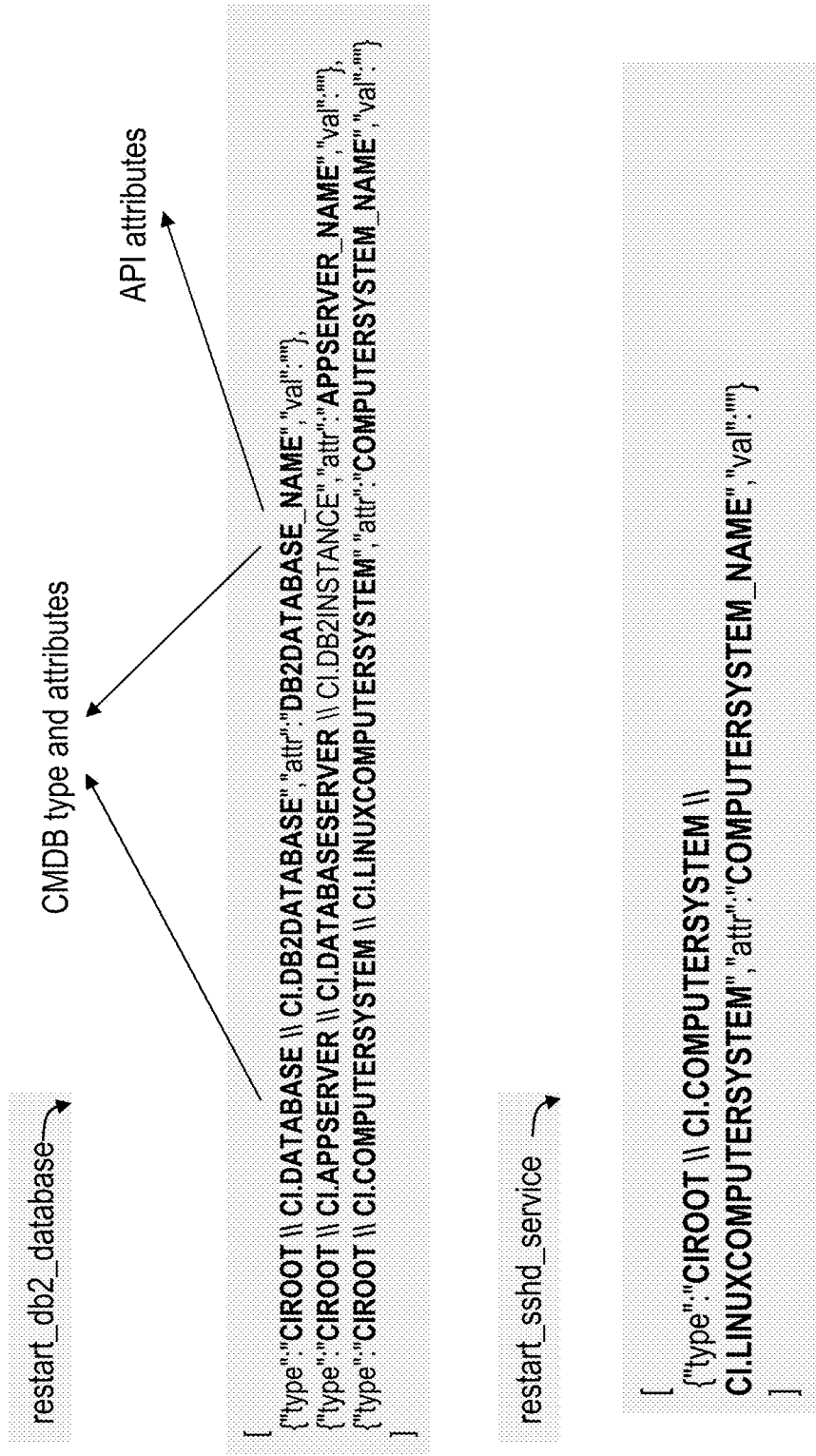
FIG. 8 depicts examples of how the concept of an attribute identifies the correct knowledge base entities in the knowledge graph of domain concepts according to embodiments of the invention.

Referring to FIG. 2, at block 226, the NL based processing system (module) 138 is configured to automatically perform intent-specific parameter type recommendation. Based on the selected API(s) according to the determined intent of the service request, the intent-specific parameter type recommendation is configured to retrieve parameters and concepts from intent-API meta database 136, and auto-fill parameter values (for the selected API) based on concepts obtained from KB by matching appropriate word tokens. For example, the NL based processing system (module) 138 uses the selected API to match and retrieve intent-specific parameters in the intent-API meta database 136. FIG. 8 depicts examples of how the concept of an attribute helps to identify the correct KB entities in the knowledge graph of domain concepts module 132 and derives the correct parameter values to auto-fill in the intent-API meta database 136. The two APIs (restart_db2_database and restart_sshd_service) with the greatest weight respectively were selected, and now parameters are selected/recommended that fulfill these APIs. As an example of parameters that apply to restart_db2_database (as depicted in FIG. 8), DB2DATABASE_NAME belongs to the concept type CI.DATABASE\\CI.DB2DATABASE, which denotes the value for this attribute is a database name, in particular, a db2 database name. The example parameters that apply for restart_sshd_service are also shown FIG. 8.

At block 228, the NL based processing system (module) 138 is configured to perform parameter completion. Parameter completion is configured to interact (optionally) with user to complete missing parameters (e.g., by asking the user to confirm the selected parameter(s) is correct), validate relations among the supplied parameter values based on KB, and generate a structured data consumable by a machine API (in the APIs 106). As part of the parameter completion/recommendation, FIG. 9 depicts how the KB 132 is used to evaluate the validity of different parameter value permutations and auto-fill missing parameters. As part of the parameter completion/recommendation (optionally), FIG. 10 depicts the output of a list of possible valid parameter-value compositions for user feedback.

Figure 10:
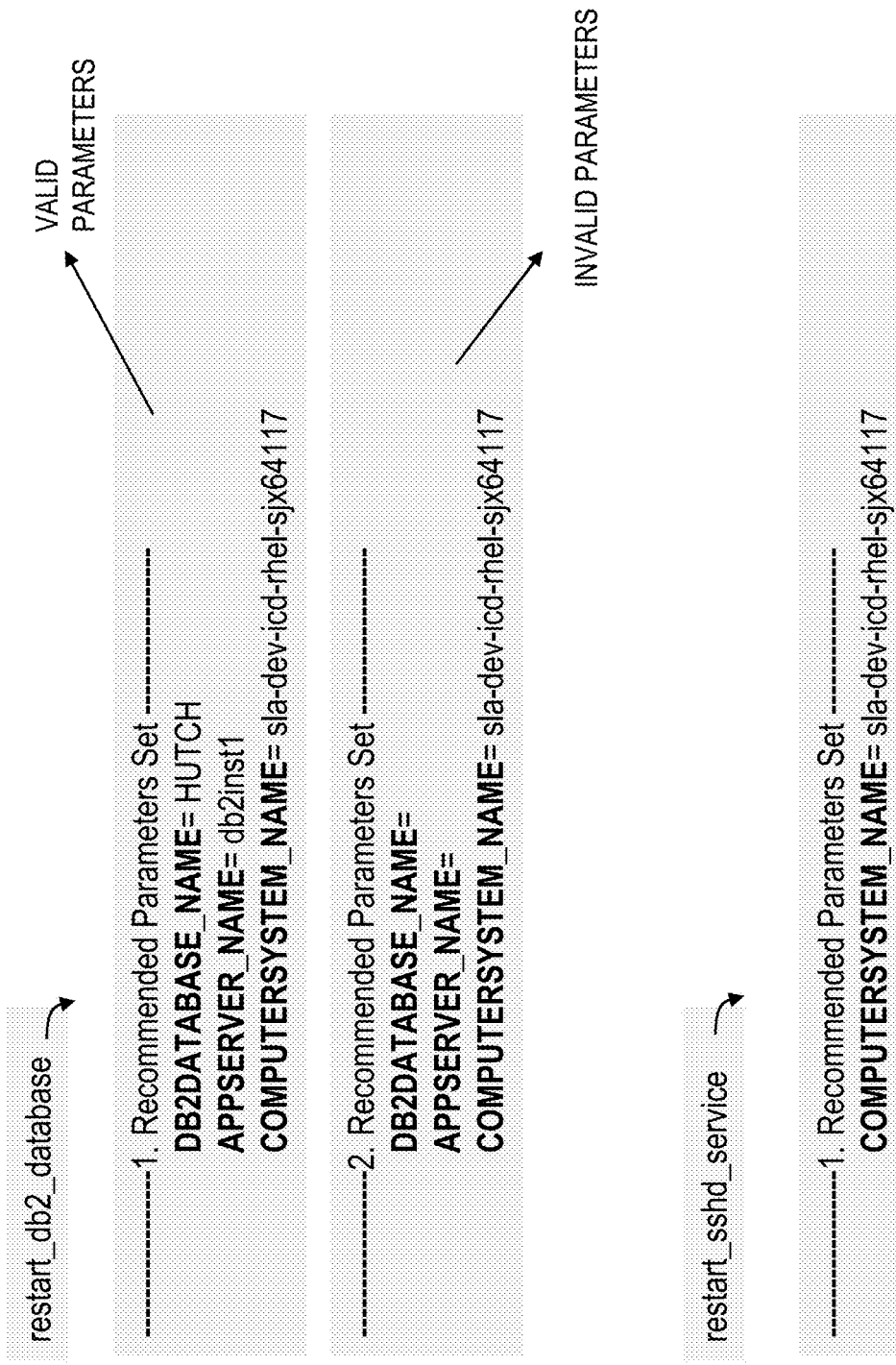
FIG. 10 depicts an output of a list of possible valid parameter-value compositions for user feedback according to embodiments of the invention.

At block 230, the NL based processing system (module) 138 is configured to perform concept to reality association as a learning procedure for the KB (knowledge graph of domain concepts 132) which can include any user feedback (from block 228 and FIGS. 9 and 10). The concept to reality association is configured to apply the newly learned concepts and entities to expand and/or edit the KB 132. At block 232, the state manager module 110 is configured to receive the identified API call request, the associated parameters, and associated service request information (i.e., requester, approvals, service ticket ID, etc.) from the NL based processing system (module) 138. The state manager module 110 is configured to manage the change process of each service request for specific hardware and software execution, including formulating the API call with expected call format and data payload, conduct authentication and access control, facilitating communication with execution engine and manage execution states.

At block 234, the execution engine module 108 is configured to execute the requested API and perform actual changes, both software and hardware configurations and alterations. The execution engine module 108 can perform API calls to the APIs 106 in accordance with the desired service request, such as to restart the particular database(s) in the hardware and software components 150). Accordingly, embodiments of the invention can take one or more service request from a human user and automatically transform NL-based commands into valid application programming interfaces and parameters to be executed on hardware and software components 150 (servers, etc.) in a datacenter.

Figure 11:
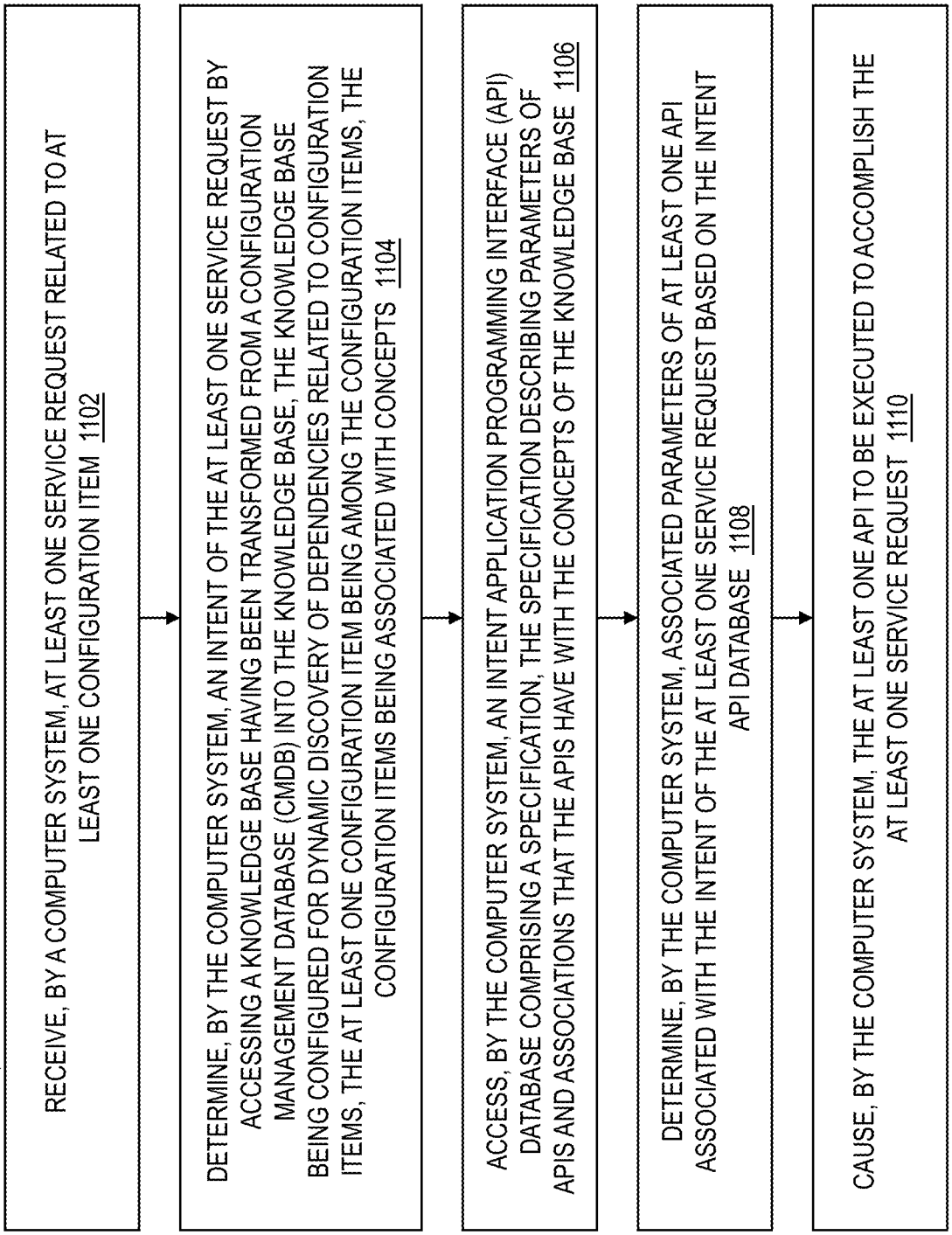
FIG. 11 depicts a flow chart of a computer-implemented method for natural language automation to implement service requests according to embodiments of the invention.

FIG. 11 depicts a flow chart of computer-implemented method 1100 for natural language automation to implement service requests according to embodiments of the invention. The computer system (e.g., one or more computer systems 102A through 102E) is configured to receive at least one service request related to at least one configuration item at block 1102 and determining an intent of the at least one service request by accessing a knowledge base 132 having been transformed from a configuration management database (CMDB) 104 into the knowledge base 132 at block 1104. The knowledge base being configured for dynamic discovery of dependencies related to configuration items, the at least one configuration item being among the configuration items, the configuration items being associated with concepts. At block 1106, the computer system (e.g., one or more computer systems 102A through 102E) is configured to access an intent application programming interface (API) database 136 including a specification, the specification describing parameters of APIs 106 and associations that the APIs 106 have with the concepts of the knowledge base 132. At block 1108, the computer system (e.g., one or more computer systems 102A through 102E) is configured to determine associated parameters of at least one API 106 associated with the intent of the at least one service request based on the intent API database 136. At block 1110, the computer system (e.g., one or more computer systems 102A through 102E) is configured to cause the at least one API 106 to be executed to accomplish the at least one service request.

The service request is received from a human user in natural language as depicted in FIG. 2. Determining the intent of the at least one service request by accessing the knowledge base 132 having been transformed from the CMDB 104 into the knowledge base 132 includes generating word tokens from the service request and using the word tokens search in the knowledge base 132 to determine at least one concept (such as example concept 402) related to the at least one service request. At least one concept related to the at least one service request includes a concept type, instance attributes, and instance relations as defined as the at least one configuration item in the knowledge base 132, and the computer system (e.g., one or more computer systems 102A through 102E) is configured to further determine the intent of the at least one service request according to the at least one concept. The intent is one of a plurality of recommended intents, weights are applied to the plurality of recommended intents according to appearances of terms from concepts associated with the at least one service request, and the intent is selected from the plurality of recommended intents as having the greatest weight as depicted in FIGS. 6 and 7.

Determining the associated parameters of the at least one API 106 associated with the intent of the at least one service request based on the intent API database 136 includes the computer system (e.g., one or more computer systems 102A through 102E) is configured to mapping/matching the intent to API parameters to identify the associated parameters of the at least one API 106. Causing the at least one API 106 to be executed to accomplish the at least one service request includes the computer system (e.g., one or more computer systems 102A through 102E) modifying at least one component selected from the group consisting of software components and hardware components.

Figure 12:
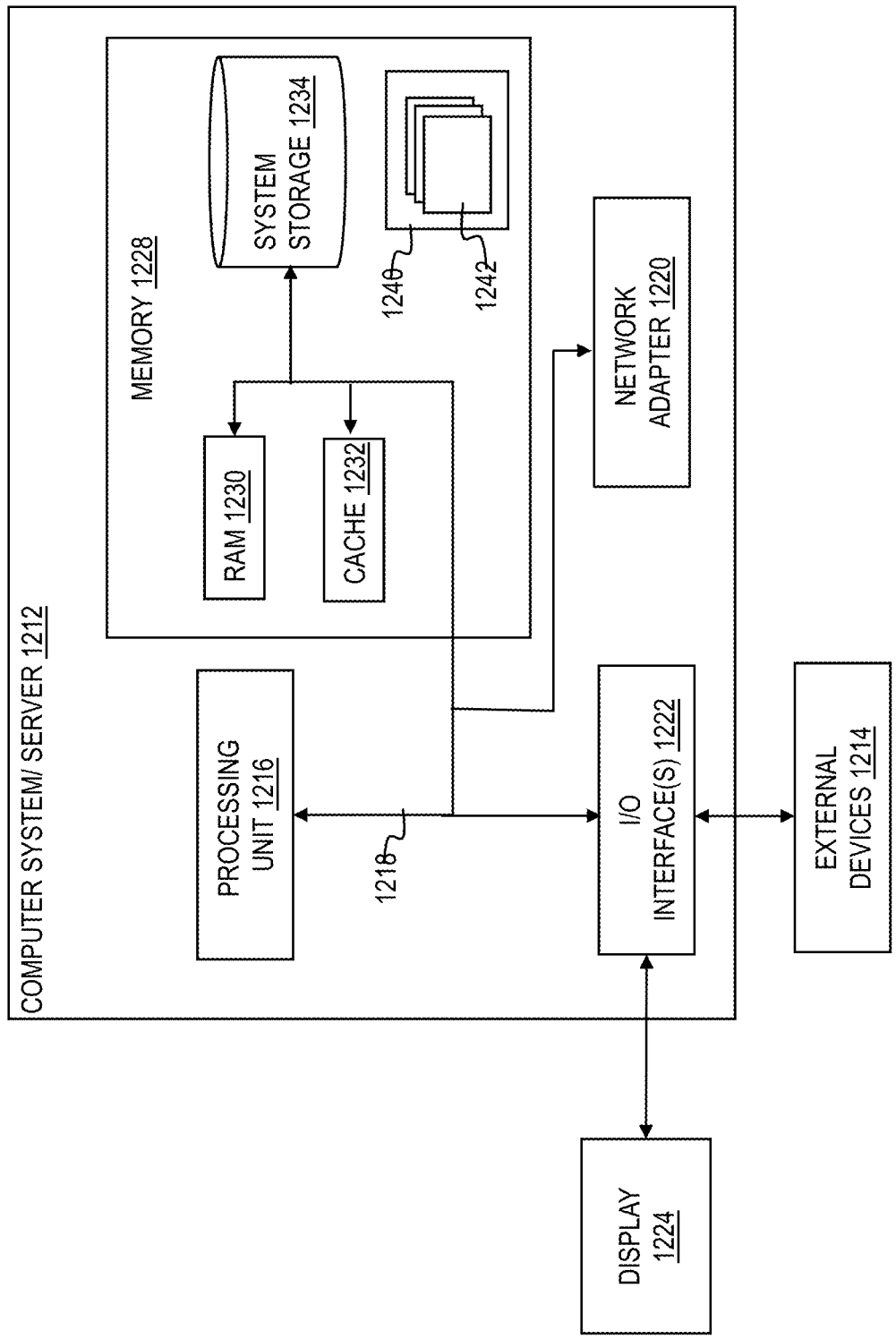
FIG. 12 depicts a schematic of an example computing system having elements and functions which operate as discussed herein in FIGS. 1-11 according to embodiments of the invention.

FIG. 12 depicts a schematic of an example computing system 1212 according to embodiments of the present invention. The computer system/server 1212 can be operational with numerous other general purpose or special purpose computing system environments or configurations. The computer system/server 1212 can be representative of various types of computer systems on which communication functions can run in the communication system/network 100. The functions and capabilities of computing system 1212 can be utilized in FIGS. 1-11 to implement features of the computing systems 102A through 102E, hardware and software components 150, servers, etc., according to embodiments of the invention.

Examples of well-known computing systems, environments, and/or configurations that can be representative of and/or include elements of computer system/server 1212 include, but are not limited to, personal computer systems, phones (e.g., cellphones, smart phones, etc.), server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1212 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1212 may be practiced in distributed cloud computing environments where tasks are performed by remote processing devices that are linked through a communications network. In a distributed cloud computing environment, program modules may be located in both local and remote computer system storage media including memory storage devices.

The components of computer system/server 1212 may include, but are not limited to, one or more processors or processing units 1216, a system memory 1228, and a bus 1218 that couples various system components including system memory 1228 to processor 1216. Bus 1218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1212 typically includes a variety of computer system readable media. Such media may be any available media that is accessible by computer system/server 1212, and it includes both volatile and non-volatile media, removable and non-removable media. The system memory 1228 can include computer system readable media in the form of volatile memory, such as random access memory (RAM) 1230 and/or cache memory 1232. Computer system/server 1212 may further include other removable/non-removable, volatile/non-volatile computer system storage media. By way of example only, storage system 1234 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1218 by one or more data media interfaces. Memory 1228 may include at least one program product having a set (e.g., at least one) of program modules that are configured to carry out the functions of embodiments of the invention.

Program/utility 1240, having a set (at least one) of program modules 1242, may be stored in memory 1228 by way of example, and not limitation, as well as an operating system, one or more application programs, other program modules, and program data. Each of the operating system, one or more application programs, other program modules, and program data or some combination thereof, may include an implementation of a networking environment. Program modules 1242 generally carry out the functions and/or methodologies of embodiments of the invention as described herein.

Computer system/server 1212 may also communicate with one or more external devices 1214 such as a keyboard, a pointing device, a display 1224, etc.; one or more devices that enable a user to interact with computer system/server 1212; and/or any devices (e.g., network card, modem, etc.) that enable computer system/server 1212 to communicate with one or more other computing devices. Such communication can occur via Input/Output (I/O) interfaces 1222. Still yet, computer system/server 1212 can communicate with one or more networks such as a local area network (LAN), a general wide area network (WAN), and/or a public network (e.g., the Internet) via network adapter 1220. As depicted, network adapter 1220 communicates with the other components of computer system/server 1212 via bus 1218. It should be understood that although not shown, other hardware and/or software components could be used in conjunction with computer system/server 1212. Examples, include but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for natural language automation to implement service requests, the computer-implemented method comprising:
   receiving, by a computer system, a service ticket comprising at least one service request related to at least one configuration item, the service ticket being from a human user in natural language and requesting a restart to a database on at least one running computer system;
   determining, by the computer system, an intent of the at least one service request by accessing a knowledge base having been transformed from a configuration management database (CMDB) into the knowledge base, the knowledge base being configured for dynamic discovery of dependencies related to configuration items, the at least one configuration item being among the configuration items, the configuration items being associated with concepts;
   accessing, by the computer system, an intent application programming interface (API) database comprising a specification, the specification describing parameters of APIs and associations that the APIs have with the concepts of the knowledge base;
   determining, by the computer system, associated parameters in the intent API database corresponding to at least one of the concepts of the knowledge base having been transformed from the CMDB such that the associated parameters in the intent API database are associated with the intent of the at least one service request, the associated parameters being for at least one API; and
   causing, by the computer system, the at least one API to be executed to accomplish the restart to the database on the at least one running computer system identified in the service ticket in response to the service ticket being from the human user in the natural language making the restart to the database on the at least one running computer system.

2. The computer-implemented method of claim 1, wherein determining the intent of the at least one service request by accessing the knowledge base having been transformed from the CIVIDB into the knowledge base comprises generating word tokens from the at least one service request and using the word tokens to search in the knowledge base to determine at least one concept related to the at least one service request.

3. The computer-implemented method of claim 1, wherein:
   at least one concept related to the at least one service request comprises a concept type, instance attributes, and instance relations as defined as the at least one configuration item in the knowledge base; and
   the computer-implemented method further comprises determining the intent of the at least one service request according to the at least one concept.

4. The computer-implemented method of claim 1, wherein:
   the intent comprises one of a plurality of recommended intents;
   weights are applied to the plurality of recommended intents according to appearances of terms from selected concepts associated with the at least one service request; and
   the intent is selected from the plurality of recommended intents as having a greatest weight.

5. The computer-implemented method of claim 1, wherein determining the associated parameters of the at least one API associated with the intent of the at least one service request based on the intent API database comprises mapping the intent to API parameters to identify the associated parameters of the at least one API.

6. The computer-implemented method of claim 1, wherein causing the at least one API to be executed to accomplish the at least one service request comprises modifying at least one component selected from the a group consisting of software components and hardware components.

7. A system for natural language automation to implement service requests, the system comprising:
   a processor; and
   memory coupled to the processor and comprising computer-executable instructions that, when executed by the processor, cause the processor to perform a method comprising:
      receiving, by the processor, a service ticket comprising at least one service request related to at least one configuration item, the service ticket being from a human user in natural language and requesting a restart to a database on at least one running computer system;

determining, by the processor, an intent of the at least one service request by accessing a knowledge base having been transformed from a configuration management database (CMDB) into the knowledge base, the knowledge base being configured for dynamic discovery of dependencies related to configuration items, the at least one configuration item being among the configuration items, the configuration items being associated with concepts;

accessing, by the processor, an intent application programming interface (API) database comprising a specification, the specification describing parameters of APIs and associations that the APIs have with the concepts of the knowledge base;

determining, by the processor, associated parameters in the intent API database corresponding to at least one of the concepts of the knowledge base having been transformed from the CIVIDB such that the associated parameters in the intent API database are associated with the intent of the at least one service request, the associated parameters being for at least one API; and causing, by the processor, the at least one API to be executed to accomplish the restart to the database on the at least one running computer system identified in the service ticket in response to the service ticket being from the human user in the natural language making the restart to the database on the at least one running computer system.

8. The system of claim 7, wherein determining the intent of the at least one service request by accessing the knowledge base having been transformed from the CMDB into the knowledge base comprises generating word tokens from the at least one service request and using the word tokens to search in the knowledge base to determine at least one concept related to the at least one service request.

9. The system of claim 7, wherein:
at least one concept related to the at least one service request comprises a concept type, instance attributes, and instance relations as defined as the at least one configuration item in the knowledge base; and
the method performed by the processor further comprises determining the intent of the at least one service request according to the at least one concept.

10. The system of claim 7, wherein:
the intent comprises one of a plurality of recommended intents;
weights are applied to the plurality of recommended intents according to appearances of terms from selected concepts associated with the at least one service request; and
the intent is selected from the plurality of recommended intents as having a greatest weight.

11. The system of claim 7, wherein determining the associated parameters of the at least one API associated with the intent of the at least one service request based on the intent API database comprises mapping the intent to API parameters to identify the associated parameters of the at least one API.

12. The system of claim 7, wherein causing the at least one API to be executed to accomplish the at least one service request comprises modifying at least one component selected from a group consisting of software components and hardware components.

13. A computer program product for natural language automation to implement service requests, the computer program product comprising a computer readable storage medium having program instructions embodied therewith, wherein the computer readable storage medium is not a transitory signal per se, the program instructions executable by a computer system to cause the computer system to perform a method comprising:

receiving, by the computer system, a service ticket comprising at least one service request related to at least one configuration item, the service ticket being from a human user in natural language and requesting a restart to a database on at least one running computer system;

determining, by the computer system, an intent of the at least one service request by accessing a knowledge base having been transformed from a configuration management database (CMDB) into the knowledge base, the knowledge base being configured for dynamic discovery of dependencies related to configuration items, the at least one configuration item being among the configuration items, the configuration items being associated with concepts;

accessing, by the computer system, an intent application programming interface (API) database comprising a specification, the specification describing parameters of APIs and associations that the APIs have with the concepts of the knowledge base;

determining, by the computer system, associated parameters in the intent API database corresponding to at least one of the concepts of the knowledge base having been transformed from the CMDB such that the associated parameters in the intent API database are associated with the intent of the at least one service request, the associated parameters being for at least one API; and causing, by the computer system, the at least one API to be executed to accomplish the restart to the database on the at least one running computer system identified in the service ticket in response to the service ticket being from the human user in the natural language making the restart to the database on the at least one running computer system.

14. The computer program product of claim 13, wherein determining the intent of the at least one service request by accessing the knowledge base having been transformed from the CIVIDB into the knowledge base comprises generating word tokens from the at least one service request and using the word tokens to search in the knowledge base to determine at least one concept related to the at least one service request.

15. The computer program product of claim 13, wherein:
at least one concept related to the at least one service request comprises a concept type, instance attributes, and instance relations as defined as the at least one configuration item in the knowledge base; and
the method performed by the computer system further comprises determining the intent of the at least one service request according to the at least one concept.

16. The computer program product of claim 13, wherein:
the intent comprises one of a plurality of recommended intents;
weights are applied to the plurality of recommended intents according to appearances of terms from selected concepts associated with the at least one service request; and
the intent is selected from the plurality of recommended intents as having a greatest weight.

17. The computer program product of claim 13, wherein determining the associated parameters of the at least one API associated with the intent of the at least one service request based on the intent API database comprises mapping the intent to API parameters to identify the associated parameters of the at least one API.

\* \* \* \* \*